2,822,383

1-ACETYL-3-(6'-METHOXY-2'-NAPHTHYL) CYCLOHEXANE AND DERIVATIVES

Douglas S. Smith, Glenview, Ill., assignor to G. D. Searle & Co., Chicago, Ill., a corporation of Illinois No Drawing. Application September 12, 1955
Serial No. 533,913

6 Claims. (Cl. 260—488)

This invention relates to D-homo analogs of hormonal steroids characterized by the absence of two nuclear elements of ring C. More particularly, this invention relates to compounds of the formula

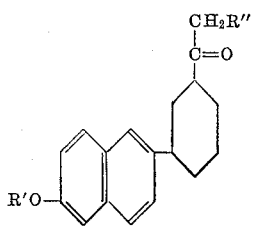

wherein R' is hydrogen or a methyl radical, and R'' is hydrogen or a hydroxyl or acetoxyl radical.

Oxyengated, alkyl-substituted derivatives of cyclopentanoperhydrophenanthrene have come to be recognized as increasingly important to the life and well-being of the animal body. Such steroidal substances—especially the sex hormones, which are elaborated by glands of the genitalia, and cortical hormones, which are produced by the adrenals—have been found pervasively essential to normal physiological functions; and the supplementation or replacement of endogenous secretions of these hormones by the same or therapeutically similar materials externally produced, has become a cornerstone of current medical practice.

Experience has shown that the curative effects of natural-occurring steroids is ofttimes markedly enhanced by modifications of their chemical structure to augment particular activities or otherwise better adapt them to specific glandular dysfunctions. Compounds of the type produced by the invention here disclosed provide such new molecular arrangements, being interpretable as derived from cyclopentanoperhydrophenanthrene.

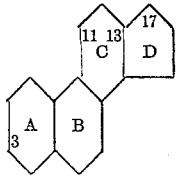

by aromatization of rings A and B, elimination of the methylene groups at 11 and 12, enlargement of the D ring to 6 members, and appropriate alkylation and/or oxygenation of carbons 3 and 17a.

Among the useful pharmacological properties displayed by the compounds of this invention is a capacity for protection of the organism against hyperemia associated with specific types of iritis. Also, the claimed compounds are valuable because of their regulatory effect on the cardiovascular system, being anti-hypertensive agents distinguished by both prolonged and relatively unilateral effect.

The subject compounds are generally insoluble in water, but may be dissolved in alcohol, lower esters such as ethyl acetate, and other common organic solvents. The compounds may be administered in solid form as tablets or capsules; dissolved or suspended in aqueous media, they may be given parenterally.

The compounds to which this invention relates may be prepared, starting with 3-(6'-methoxy-2'-naphthyl)-cyclohexanone—described by Novello and Christy, Journal American Chemical Society, 75, 5431—by successive cyanohydroxylation, dehydration, reduction, and Grignard conversion to the corresponding acetyl compound. This, in turn, may be treated with pyridine hydrochloride to produce the 6'-hydroxy derivative, or condensed with ethyl oxylate, iodinated, and finally reacted with potassium acetate to give the acetoxyacetyl compound. The latter substance may be hydrolyzed to the ketol, which, finally, can be cleaved with pyridine hydrochloride to the dihydroxy derivative.

The following examples describe in detail certain of the compounds illustrative of the present invention, and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed temperatures are given in degrees centigrade (° C.) and relative amounts of materials in parts by weight, except as otherwise noted.

EXAMPLE 1

(A) *1-cyano-1-hydroxy-3-(6'-methoxy-2'-naphthyl)-cyclohexane*

To a mixture of 77 parts of 3-(6'-methoxy-2'-naphthyl)-cyclohexanone and 220 parts of potassium cyanide in 1200 parts of ethyl alcohol at reflux temperatures is very slowly added 230 parts of glacial acetic acid. The reactants are maintained at reflux temperatures for 30 minutes, at which point an additional 32 parts of acetic acid is introduced. Five minutes later, the hot reaction mixture is poured into a large excess of ice water. An ether extraction is carried out, following which the organic layer is washed and finally stripped of solvent at approximately 90° C. The residue is 1-cyano-1-hydroxy-3-(6'-methoxy-2'-naphthyl)cyclohexane of the formula

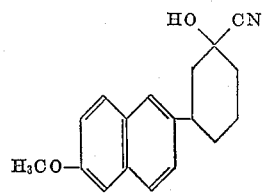

(B) *1-cyano-3-(6'-methoxy-2'-naphthyl)cyclohexene*

Approximately 86 parts of the cyanohydrin of the preceding part A of this example is dissolved in 588 parts of pyridine. To the resulting solution is cautiously added 140 parts of phosphorus oxychloride. The reactants are heated at reflux temperatures for 40 minutes and then poured into an excess of ice water containing approximately 1800 parts of muriatic acid. This mixture is extracted with ether, following which the organic layer is washed and then stripped of solvent at 90° C. The vacuum-dried residue is 1-cyano-3-(6'-methoxy-2'-naphthyl)cyclohexene, which may be represented by the formula

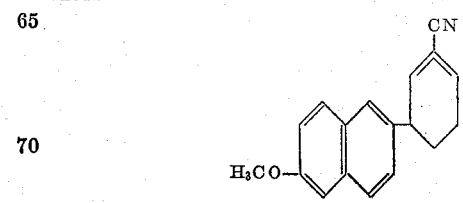

(C) *1-cyano-3-(6'-methoxy-2'-naphthyl)cyclohexane*

The unsaturated material obtained by the process of Example 1B is hydrogenated at atmospheric pressures, using 2 parts of 5% palladium on charcoal, 45 parts of benzene, and 40 parts of ethyl alcohol for each 8 parts of material reduced. When the theoretical uptake of hydrogen is substantially complete, catalyst is filtered out and rinsed with acetone, whereupon the combined filtrate and rinse is evaporated under nitrogen. The residue, 1-cyano-3-(6'-methoxy-2'-naphthyl)cyclohexane, has the formula

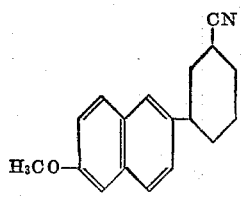

(D) *1-acetyl-3-(6'-methoxy-2'-naphthyl)cyclohexane*

To a solution of 15 parts of methyl magnesium bromide in 415 parts of dry benzene containing approximately 22 parts of anhydrous ether is added approximately 8 parts of the cyclohexane derivative of the preceding Part C of this example in 90 parts of dry benzene. The reactants are heated at reflux temperatures for 3 hours and then cooled, at which point 90 parts of muriatic acid and 100 parts of water is cautiously introduced. The mixture is allowed to stand overnight and then heated to reflux temperatures for 1 hour with agitation. The organic layer is separated and subsequently combined with an ether extract of the aqueous layer. The resultant solution is washed with water and then evaporated to dryness in an atmosphere of nitrogen. The vacuum-dried residue is purified by chromatography on silica gel, using benzene and ethyl acetate as developing solvents. Repeated crystallization from n-hexane affords 1-acetyl-3-(6'-methoxy-2'-naphthyl)cyclohexane, which melts at 83-84.5° C. The product has the formula

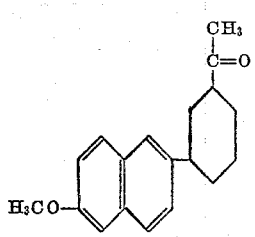

The foregoing material is polymorphic, and may be obtained also as crystals melting at 72.4–73.4° C. A mixture of the two forms melts at 83–84° C. The infrared spectra in chloroform solution (2% w./v.) are identical, in potassium bromide (0.5%), slightly different.

EXAMPLE 2

*1-acetyl-3-(6'-hydroxy-2'-naphthyl)cyclohexane*

A mixture of 25 parts of purified pyridine hydrochloride and 2 parts of 1-acetyl-3-(6'-methoxy-2'-naphthyl)cyclohexane is heated at reflux temperatures for 30 minutes. The reactants are then poured into an excess of ice water, and the resultant mixture is twice extracted with ether. The combined ether extracts are washed with water, following which solvent is stripped by evaporation at approximately 90° C. The vacuum-dried residue is purified by chromatography on silica gel, using benzene and ethyl acetate as developing solvents. Crystallization from a mixture of ether and cyclohexane, and recrystallization from ether alone, affords 1-acetyl-3-(6'-hydroxy-2'-naphthyl)cyclohexane as a mixture of racemates melting in the range 129–144° C. The product has the formula

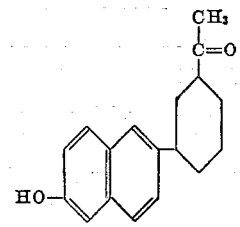

EXAMPLE 3

*1-acetoxyacetyl-3-(6'-methoxy-2'-naphthyl)cyclohexane*

The following operations are carried out under an atmosphere of nitrogen. A solution of 64 parts of redistilled diethyl oxalate in 710 parts of anhydrous ether is added to approximately 14 parts of sodium methoxide, whereupon a solution of 46 parts of 1-acetyl-3-(6'-methoxy-2'-naphthyl)cyclohexane in a mixture of 2800 parts of anhydrous ether and 1300 parts of dry benzene is rapidly introduced. The reactants are heated with agitation at reflux temperatures for 4 hours and then cooled. The precipitated product is collected on a filter, washed thereon with ether, and finally dried in vacuo. The residue is taken up in 630 parts of methyl alcohol, and this solution is treated at −15° C. with 22 parts of iodine dissolved in approximately 800 parts of methyl alcohol. The reactants are allowed to stand for 30 minutes at −15° C. with agitation, at which point a solution of sodium methoxide made from 2.3 parts of sodium is added. The resultant mixture is allowed to stand at room temperatures for half an hour, following which it is filtered and the filtrate poured into a large excess of ice water. The gummy precipitate which forms is collected on a filter and subsequently recovered therefrom by extraction with acetone. The acetone extract is heated at reflux temperatures for 5 hours with a mixture consisting of 61 parts of glacial acetic acid, 105 parts of potassium acetate, 1250 parts of water, and approximately 4000 parts of acetone. The reactants are evaporated to approximately one-fourth the original volume, then diluted with water, and finally extracted with ether. The ether layer is washed and evaporated to dryness. The vacuum-dried residue is purified by chromatography on silica gel, using benzene, n-hexane, and ethyl acetate as developing solvents. Repeated crystallization from methyl alcohol affords pure 1-acetoxyacetyl-3-(6'-methoxy-2'-naphthyl)cyclohexane, which melts at 130–131° C. The product has the formula

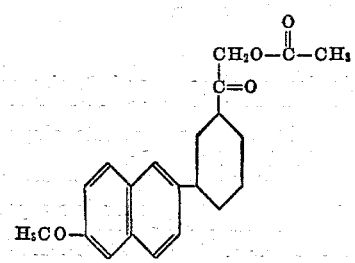

EXAMPLE 4

*1-hydroxyacetyl-3-(6'-methoxy-2'-naphthyl)cyclohexane*

To 1 part of the acetoxyacetyl compound of the preceding Example 3 dissolved in 32 parts of methyl alcohol is slowly added one equivalent of 10% aqueous sodium hydroxide. The reactants are let stand at room temperature for 1 hour, then poured into a large excess of water.

Filtration of the resultant mixture affords 1-hydroxyacetyl-3-(6'-methoxy-2'-naphthyl)cyclohexane, of the formula

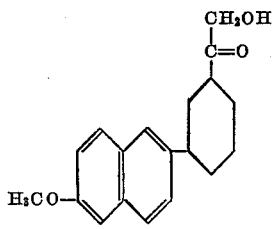

EXAMPLE 5

*1-hydroxyacetyl-3-(6'-hydroxy-2'-naphthyl)cyclohexane*

To 13 parts of purified pyridine hydrochloride is added 1 part of the hydroxyacetyl compound of the preceding Example 4, in powdered form. The resultant solution is heated at reflux temperatures for approximately 30 minutes. The reactants are then poured into an excess of ice water, and the mixture which results is extracted with ether. The ether extract is washed and then stripped of solvent by evaporation. The residue is purified by chromatography on silica gel, using benzene and ethyl acetate as developing solvents. The 1-hydroxyacetyl-3-(6'-hydroxy-2'-naphthyl)cyclohexane thus obtained has the formula

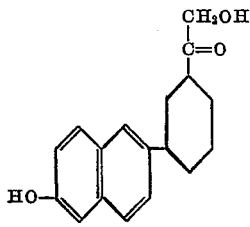

What is claimed is:
1. A compound of the formula

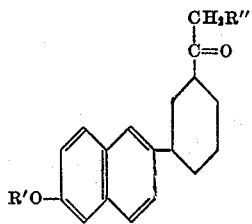

wherein R' is selected from the group consisting of hydrogen and methyl radicals, and R'' is selected from the group consisting of hydrogen and hydroxyl and acetoxyl radicals.

2. 1-acetyl-3-(6'-methoxy-2'-naphthyl)cyclohexane.
3. 1-acetyl-3-(6'-hydroxy-2'-naphthyl)cyclohexane.
4. 1-acetoxyacetyl-3-(6'-methoxy-2'-naphthyl)cyclohexane.
5. 1-hydroxyacetyl-3-(6'-methoxy-2'-naphthyl)cyclohexane.
6. 1-hydroxyacetyl-3-(6'-hydroxy-2'-naphthyl)cyclohexane.

References Cited in the file of this patent
UNITED STATES PATENTS

| | | |
|---|---|---|
| 2,618,653 | Novello | Nov. 18, 1952 |
| 2,687,436 | Novello | Aug. 24, 1954 |

UNITED STATES PATENT OFFICE
Certificate of Correction

Patent No. 2,822,383                                                        February 4, 1958

Douglas S. Smith

It is hereby certified that error appears in the printed specification of the above numbered patent requiring correction and that the said Letters Patent should read as corrected below.

Column 1, line 27, for "Oxyengated" read —Oxygenated—; line 34, for "functions" read —function—; line 47, strike out the period; same column 1, lines 48 to 55, the formula should appear as shown below instead of as in the patent—

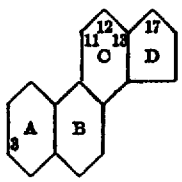

same column 1, line 58, for "3 and 17a" read —3 and 17a—; column 2, lines 65 to 72, the formula should appear as shown below instead of as in the patent—

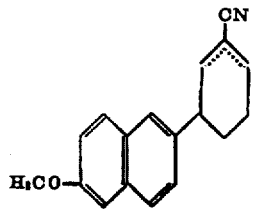

Signed and sealed this 15th day of April 1958.

[SEAL]

Attest:
KARL H. AXLINE,
*Attesting Officer.*

ROBERT C. WATSON,
*Commissioner of Patents.*